Figure 1:
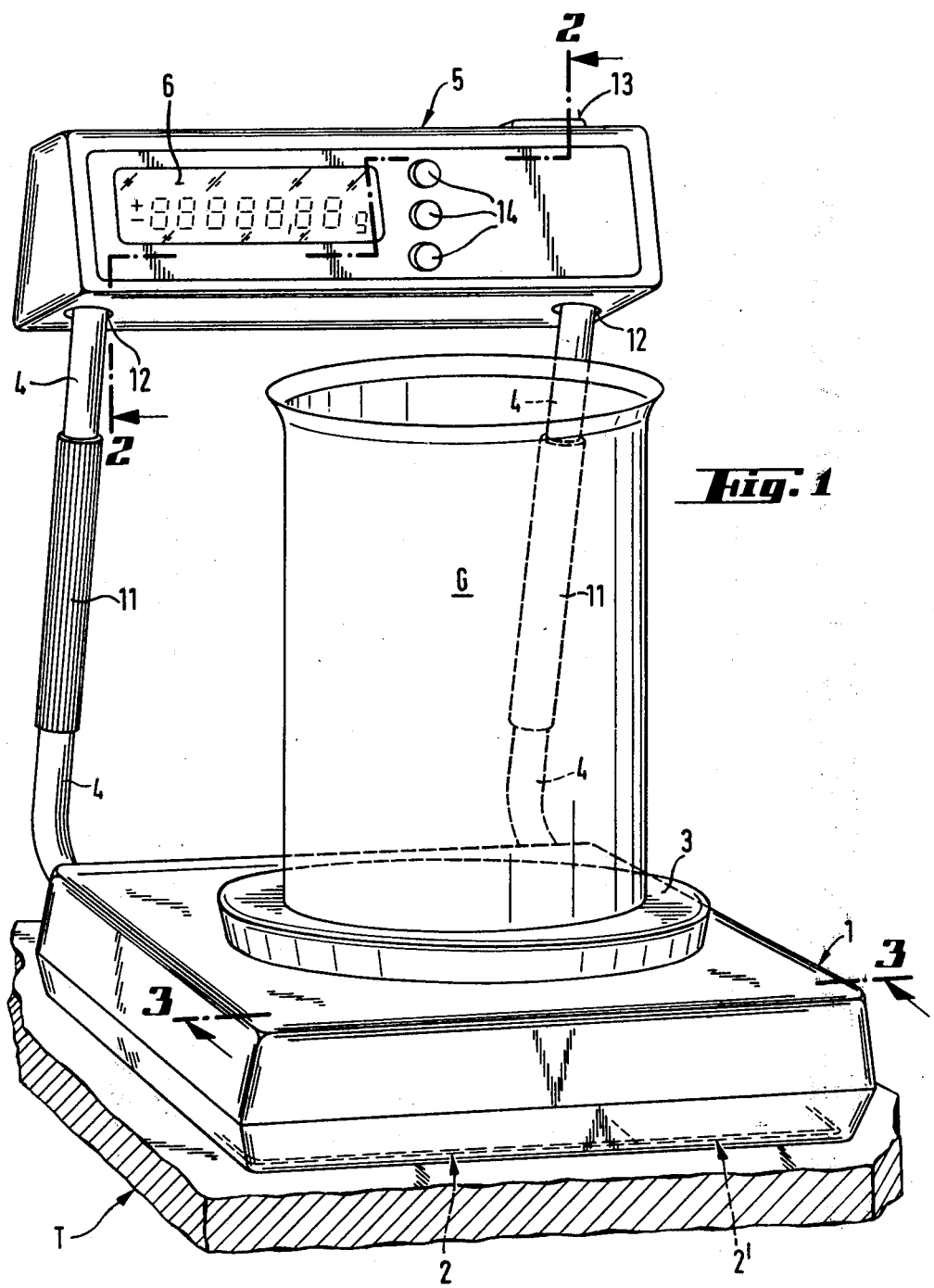

United States Patent [19]

Knothe et al.

[11] 4,416,343
[45] Nov. 22, 1983

[54] ELECTROMECHANICAL WEIGHER

[75] Inventors: Erich Knothe, Bovenden; Dieter Blawert; Bernd Schubart, both of Göttingen, all of Fed. Rep. of Germany

[73] Assignee: Sartorius GmbH, Fed. Rep. of Germany

[21] Appl. No.: 355,385

[22] Filed: Mar. 8, 1982

[30] Foreign Application Priority Data

May 13, 1981 [DE] Fed. Rep. of Germany ... 8114093[U]

[51] Int. Cl.³ .............................................. G01G 21/28
[52] U.S. Cl. .................................... 177/180; 177/241
[58] Field of Search ......................... 177/180, 238–243

[56] References Cited

U.S. PATENT DOCUMENTS

| 2,661,181 | 12/1953 | Stock | 177/238 X |
| 3,444,943 | 5/1969 | Tytus | 177/180 |
| 4,320,809 | 3/1982 | Knothe et al. | 177/243 |

Primary Examiner—George H. Miller, Jr.
Attorney, Agent, or Firm—Eric P. Schellin

[57] ABSTRACT

In an electromechanical weigher to be used in areas subject to explosion hazards, the electronic indicator ledge and the weigher apparatus or weighing system is constructed explosion proof in an intrinsically safe manner, and the power supply in the case is on all sides partitioned by means of bulkheads, and the free space enveloping these constituents is filled with an explosion-impeding granulate e.g. of quartz. For the use as dosing weigher for prescription weighings in such areas subject to explosion hazards, the indicator ledge is constructed by means of a hollow support engaging the case above the weigher dish and above a tare vessel of the usual height to be put on the weigher dish, as horizontal indicator constituent running approximately parallel to the weigher back, and the indicator constituent is tiltable at the support about a horizontal shaft in which structure the electric supply lines are passed from the indicator edge through the hollow support, into the inside of the case. The indicator constituent is furthermore provided with switches and operating keys which together with the indicator ledge ae explosion proofed in an intrinsically safe manner. For school and demonstration purposs, the indicator constituent is provided with two synchronically connected electronic indicator ledges, one pointing to the frontside and one to the backside of the weigher, which indicator ledges are arranged in a mutually parallel position inside the indicator constituent.

9 Claims, 3 Drawing Figures

ELECTROMECHANICAL WEIGHER

The invention relates to an electromagnetic weigher to be used in areas subject to explosion hazards.

Conventional electromagnetic weighers comprise an ample electric and electronic mechanism which, to be sure, on the one hand permit a quick and comfortable weighing of the material to be weighed, but on the other hand present the danger of forming by sparkover and short-circuits a means of detonation when the weigher is used in localities with explosive atmosphere or when material subject to explosion is to be weighed by the weigher. In the case of highly sensitive precision weighers, the weighing dish receiving the material to be weighed is supported by the weighing system which is mounted in an enveloping case. The weighing dish support pushes in this structure through the case without contact. The ring slot formed thereby is sealed merely by a labyrinth packing, so that the weighing dish support can move vertically, limited by stops but frictionless through the case.

This makes it impossible to seal the inner space of the case which contains the electronic mechanism in a gas-tight manner, so that inside the case the same atmosphere prevails as outside.

To be sure, it is possible in principle to build electrical construction parts in a short-circuit proof way, but in consideration of the ample electric and electronic mechanism of such precision weighers this construction is too expensive. Therefore such electronic weighers could hitherto not be used in localities subject to explosion hazards. Conventional mechanical weighing devices and also those still in use have usually likewise electrical constituents, e.g. an illumination device for the indication. Thus it is already known (German Federal Republic application DE-OS No. 18 00 688) to provide a protection against explosion for the illumination device of a weigher, especially for a scale projection device. In this structure, the lamp of the illumination device is housed in a protective case arranged in the weigher case, and is connected to the supply line via a leakage-reactance transformer that is arranged in the weigher case and lowers the voltage, which leakage-reactance transformer is at its primary side connectable and disconnectable by a switch that protects against explosion, arranged in the weigher case. In this weigher only an illumination device which in this case may contain—at still justifiable cost—a protection against explosion as electrical constituent is used. As soon as the electrical and electronic constituents exceed in number and volume a specific measure, such a device as it is proposed by prior art is too expensive. The structural parts would, moreover, be too voluminous so that they could no longer be installed in a standard weigher case, e.g. for precision and highly accurate weighers, but would have to be placed beside the weigher. This would narrow down the space of operation and impair the weighing conveniences.

To be sure, an electromechanical weigher is known (German Federal Republic application DE-OS No. 22 14 418) wherein the entire inside of the case is filled with a silicon oil whose filling level can be controlled with the aid of a sight glass and/or oil-measuring stick. The silicon oil is to protect also the entire mechanism against corrosion when the weigher is used e.g. in fish industry and must be cleaned with hot water or steam. In this known weigher, too, the load receiver supporting the load dish pushes through the upper portion of the case without contact so that the silicon oil is also subject to an evaporation and can also be fed in situ only, since it could run out of the case during the transportation of the weigher.

It is also a disadvantage and a nuisance that in such an embodiment in case of repairs the parts to be replaced must be carefully freed from an oil film.

It has therefore already been proposed (European application EP-OS No. 18 656) to arrange a commercial weigher which in itself is not prepared for use in areas subject to explosion hazards, in an enveloping pressure-proof case which has a definite resistance to a definite explosion pressure emanating from the inside, in which structure a weighing dish is provided outside the pressure-roof case and is supported by a rod system which pushes, in a closely enveloping and relatively long perforation through the pressure-proof case without contact, runs parallel in vertical direction and is supported by the load receiver of the weigher. In the area of the indicator of the pressure-proof case, a pressure-proof sight glass of transparent material is provided. The pressure-proof case is very heavy and expensive, and enlarges the weigher proper very substantially, so that the financial expense for such a weigher is justifiable for specific uses only.

The purpose of the invention is therefore to disclose a weigher—constructed by simple means—of the initially mentioned structure in such a way that it can be used widely in areas subject to explosion hazards.

Such areas subject to explosions may be the chemical area, the mill area (dust explosion), the pharmaceutical area, the drugstore area, the cosmetics area, the paint and adhesive area. In the latter areas prescriptions from various components must frequently be filled, in which operation the operator must fill a tare vessel positioned on the weighing dish with the individual components. For such cases of use the invention must take into consideration, besides the viewpoint of safety, also the convenience of weighing.

This task is achieved by the characteristics indicated in the claims.

An alternative particularly suited for dosing operations consists in that the indicator is positioned at a high level so that the operator has the dosing container or the dosing spatula in the area of the upper edge of the tare vessel and thus also in the area of the electronic indicator ledge, and an operation without fatigue is assured.

Figure 2:
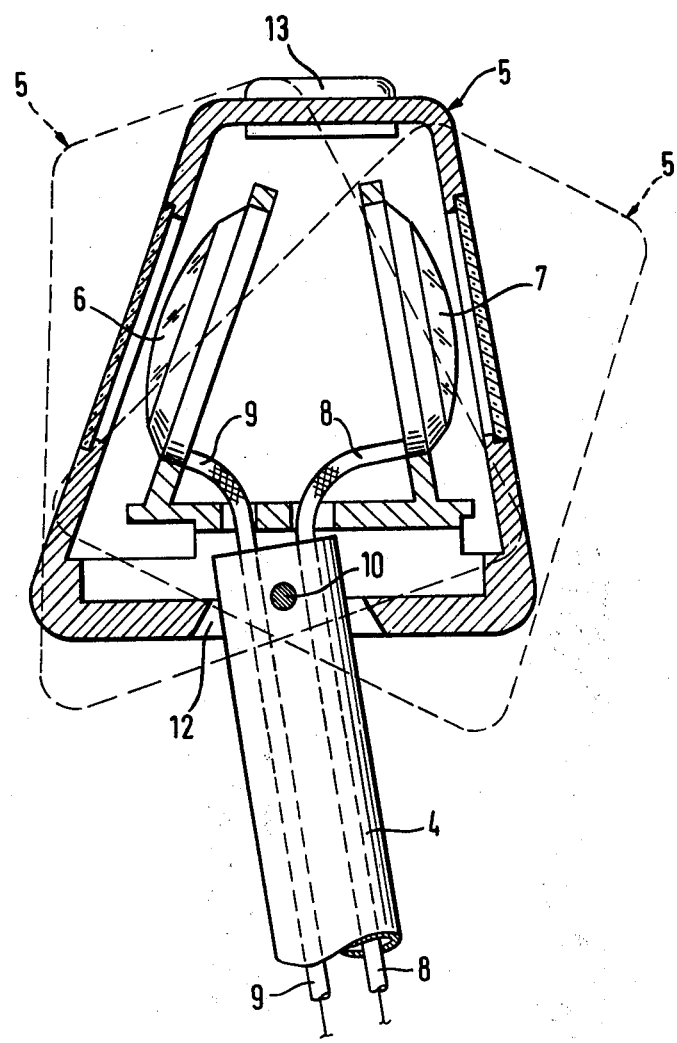
Figure 3:
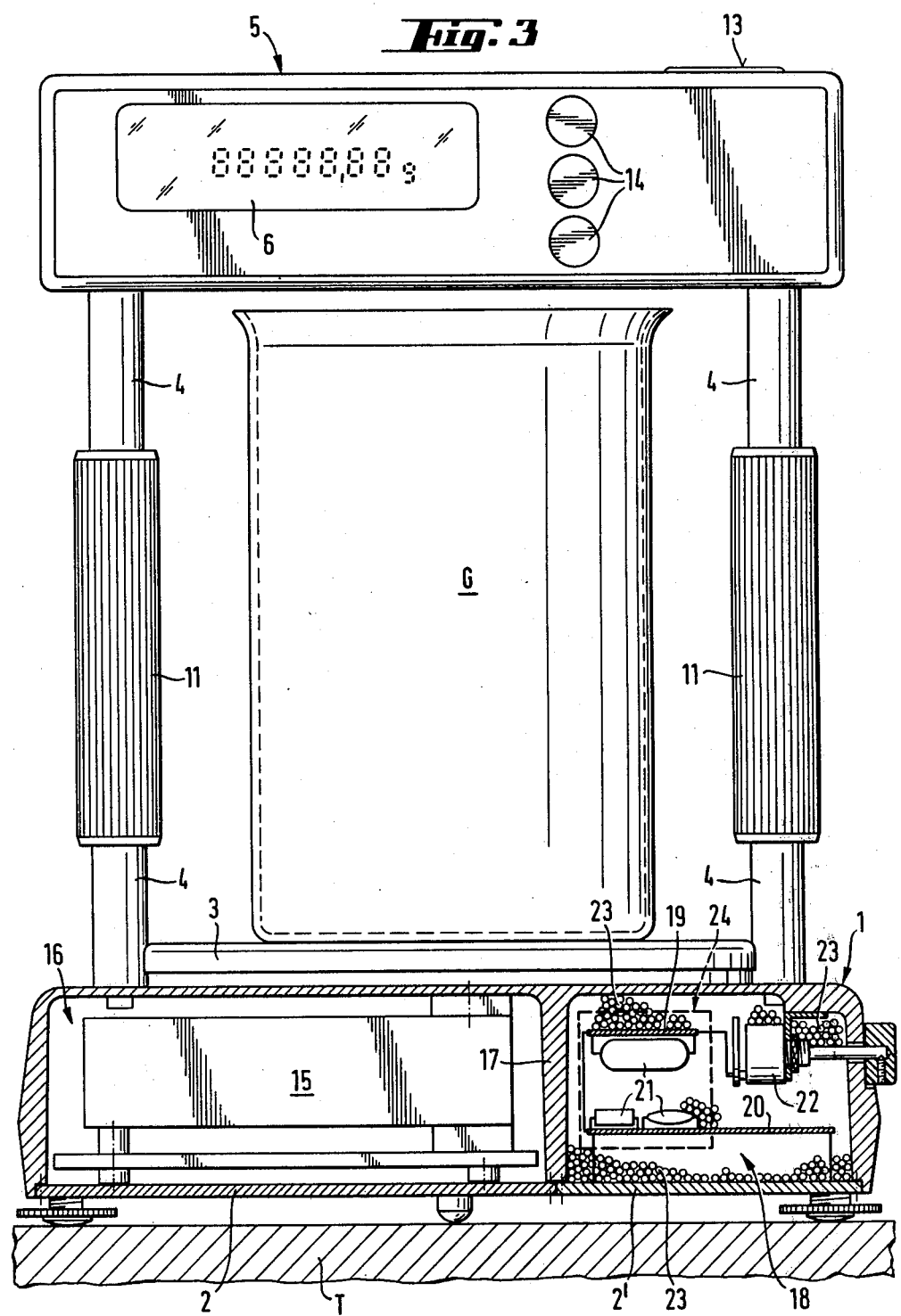

The concept of the invention which permits a very great variety of embodiment possibilities, is explained in greater detail in an embodiment with the aid of the attached drawings which show a "dosing weigher" for use in areas subject to explosion hazards. There are shown:

in FIG. 1, a perspective frontview of the weigher on a table T, in FIG. 2, a detail section through the indicator element of the weigher along intersection line 2—2 in FIG. 1, and in FIG. 3, a vertical section through the case along intersection line 3—3 in FIG. 1.

The weigher of the invention consists of an upper case portion 1 and a lower case portion 2,2', a weighing dish 3 which receives material to be weighed or in casing processes a tare vessel G and the material to be weighed, and an indicator ledge 6. Normally indicator ledge 6 is positioned at the front side in upper case portion 1. Likewise, the electronic sheet bar located in the upper case portion assigned to the indicator ledge is provided in the front area. It is evident and recognizable that the putting on of a tare vessel G of customary structural height for receiving the various components of the material to be weighed leads to the result that the look of the user who must fill the tare vessel through its opening with the various components, must continually oscillate between the lower indication in upper case portion 1 and the vessel edge. This leads to symptoms of fatigue and erroneous dosings.

For this purpose of use it is therefore proposed that the indicator ledge otherwise usually arranged in upper case portion 1 be arranged in the area of the weigher back and above the upper edge of a tare vessel G, whereby the look of the operator for the feeding of the components as well as for the control of the actual weight indication is kept in one plane. The concept of a tare vessel of the usual height is not uncertain since the material to be weighed which is to be dosed consists in most cases of liquids or pastes whose total volume and total volume and total weight can be housed in a tare vessel which is adapted to the prespecified maximum load of the weigher.

Indicator ledge 6 is, as shown in the drawing, is shaped, by means of a hollow support 4 emerging from case 1, 2 horizontally above weighing dish 3 as an indicator constituent 5 pivotable about a horizontal shaft 10. Indicator constituent 5 runs parallel approximately in the area of the weigher back, in which structure the height of support 4 is such that the digital display runs approximately in the area of the upper edge of the tare vessel G which has been put on weighing dish 3. Indicator constituent 5 is, according to the invention, tiltable or pivotable about a horizontal shaft 10, so that the user of the weigher can pivot—with respect to the tare vessel G involved,—the indicator constituent, which is approximately trapezoid in cross section, in such a manner that the dosing spatula feeding the components, or the dosing vessel is located at about the same eye level as the indicator ledge 6 proper. As shown in FIG. 2, indicator constituent 5 can, on the basis of a recess 12 between the two extreme positions shown in dashed lines be tilted. In order to make possible, for school, educational and demonstration purposes, also an observation of the actual indication turned away from the user of the weigher, the diametrically opposite side, namely the side of the indicator constituent 5 turned away from the user of the weigher is, according to the invention equipped with a further indicator ledge 7. Both indicator ledges 6, 7 are in a mutually parallel position arranged in the hollow indicator constituent 5 which is of an approximately trapezoid cross section and are electrically connected to the not shown indicator plate bar in the upper case portion 1 on the back of the weigher, by means of conductors 8,9 through the hollow support 4 or respectively, as shown, through the two hollow stays of support 4.

For the purpose of better stability of indicator constituent 5, the latter is supported by two support stays 4. The two support stays 4 of round cross section are each provided with a grip sleeve 11 which facilitate the handling and the transportation of the weigher. In order to make possible in addition to the tiltability of indicator constituent 5, an adaptation to the different heights of conventional tare vessels, support 4, according to the invention, may be constructed in vertical direction like a telescope, so that indicator constituent 5 can be adjusted even in its observation plane.

In an embodiment not shown, indicator constituent 5 is partly pivotable also about a vertical center shaft, so that for demonstration and educational purposes indicator ledges 6,7 can be observed from different angles of view.

It would be very suitable to have, in indicator constitutent 5 the switches necessary for the operation of the weigher, e.g. tare switch 13 and feed keys 14 are arranged. The weigher may also operate e.g. according to the principle of electromagnetic power compensation.

Independently of whether indicator ledge 6, as shown, is positioned at a high level or in the upper case portion, the explosion safety of the weigher is accomplished by a structure wherein according to FIG. 3 the weighing apparatus or the weighing system 15 and the indicator ledge (6,7) are themselves technically constructed in an explosion-proof way, and the power supply 24 is arranged with the electronic mechanism 19, 20, 21 in case 1, 2', 17 in such a way as to be on all sides partitioned by means of bulkheads, and the free space 18 surrounding these structural elements is filled with an explosion-impeding granulate 23 of guartz (i.e. sand or glass beads) or the like. Of course, it is also possible to encase only certain parts of the electronic mechanism in sand and to construct the other parts of the evaluation and switching electronic elements in an intrinsically safe manner. As shown in the sectional illustration of FIG. 3, the weighing system diagrammatically indicated with position 15 may consist of a parallel construction with control handles and levers as well as a pot-shaped magnet with compensation coil. Such weighing systems operating according to the principle of electromagnetic power compensation are prior art, e.g. by German Federal Republic Patent DE-PS No. 25 18 022 and U.S. Pat. No. 4,062,416. Likewise, the weighing system may consist also of a transverse beam with resistive wire strain according to U.S. Pat. No. 4,125,168.

The concept intrinsically explosion-proof has been defined by public regulations in the German Federal Republic and means e.g. in the present case of application of these regulations that the ratio between current intensity and cross section of the conducting wire is so low that a spark formation—produced by creeping currents or static charge—cannot occur and the heating of the constituents on the basis of a power loss of the electric system remains far below a critical ignition temperature of explosive materials.

The constituents that cannot or can only at considerable construction cost be manufactured in an intrinsically safe manner are according to the invention arranged in case 1, 2', 17 in such a way as to be partitioned on all sides by bulkheads, and the free space 18 surrounding these constituents or the chamber 18 is filled with an explosion-impeding granulate 23 of quartz or another material with corresponding properties. As shown in FIG. 3, the case consists of a one-piece upper portion 1 with a bulkhead partition 17 which divides upper portion 1 into at least two separate chambers 16 and 18, each chamber being closed with a separate base plate 2 or 2'. In chamber 18, there are located e.g. power supply 24 in the form of a transformer, two sheet bars 19 and 20 with electronic constituents 21 for the evaluating and switching electronic mechanism, and a rotary switch 22 whose enclosed part is likewise enveloped on all sides with quartz granulate 23. The protruding portions of switch 22 are constructed with "increased safety". The same applies to the introduction of the power cord in upper case portion 1, and to the plug connections of the data lines. The feed lines passing through the hollow support 4 for indicator ledge 6 or 7 are also only constructed and arranged according to these rules of "increased safety".

To preserve the explosion safety of the weigher—guaranteed by the manufacturer—, the two base elements 2,2' are cemented together with upper portion 1 or durably connected by other safety elements and possibly sealed, so that the apparatus can be repaired in the manufacturing plant only. The thickness of the granulate layer toward the bulkhead partition 17 and toward the outside of the case amounts to at least 5 mm.

In cases where a battery or accumulator instead of the power supply as current supplier forms a constituent of the weigher, these constituents are likewise constructed in an intrinsically safe manner. In such an embodiment, only the evaluation and switching electronic mechanism is encased by the quartz granulate. The preferred embodiment of explosion impeding quartz granulate consists of quartz glass beads, preferably with grain diameter of 250 micrometers to 1.6 mm.

What is claimed is:

1. An electromechanical weigher to be used in areas subject to explosion hazards comprising:
    an electro-mechanical weighing mechanism adapted and constructed to be explosion-proof by having the ratio of current intensity to wire cross section be so low that spark formation cannot occur and the heating of constituents on the basis of power loss of the electric system remains far below a critical ignition temperature of explosive material, wherever it is possible in the components of said mechanism to do so; and
    a case for said mechanism adapted and constructed so that all components of said mechanism which cannot be explosion-proofed are enclosed in chambers which are filled with explosion-impeding granular material.

2. A weigher as in claim 1 wherein the power supply for said mechanism and all switches are enclosed in said chambers which are filled with explosion-impeding granular material.

3. A weigher as in claim 1 wherein said electromechanical weighing mechanism includes a digital display.

4. A weigher as in claim 3 where said digital display is enclosed in an indicator ledge above a tare vessel.

5. A weigher as in claim 3 where said digital display is enclosed in an indicator ledge capable of being set at an adjustable height above a weighing dish.

6. A weigher as in claim 5 adapted and constructed so that said indicator ledge is tiltable.

7. A weigher as in claim 5 additionally comprising a second digital display displaying the same information as said first digital display arranged so that one said display faces front and said other display faces to the rear.

8. A weigher as in claim 1, 3, 4, 2, 5, 6, or 7 where said explosion-impeding material is quartz sand.

9. A weigher as in claims 1, 3, 4, 2, 5, 6, or 7 where said explosion-impeding granular material is quartz glass beads with a grain diameter of 250 micrometer to 1.6 mm.

* * * * *